United States Patent [19]

Schram

[11] Patent Number: 5,033,033

[45] Date of Patent: Jul. 16, 1991

[54] ULTRASONIC SYSTEMS

[75] Inventor: Cornelius J. Schram, Pavenham, England

[73] Assignee: National Research Development Corporation, London, United Kingdom

[21] Appl. No.: 530,899

[22] Filed: May 30, 1990

[30] Foreign Application Priority Data

May 31, 1989 [GB] United Kingdom ............... 89124200

[51] Int. Cl.$^5$ ............................................. H04B 1/02
[52] U.S. Cl. .................................... 367/191; 181/0.5; 367/137
[58] Field of Search .................. 181/0.5; 367/140, 141, 367/191, 137, 138; 73/505; 210/748; 209/155

[56] References Cited

U.S. PATENT DOCUMENTS

| | | | |
|---|---|---|---|
| 3,070,097 | 1/1963 | Scarpa | 367/191 |
| 4,463,606 | 8/1984 | Barmatz | 181/0.5 |
| 4,554,477 | 8/1985 | Ratcliff | 73/505 |
| 4,673,512 | 6/1987 | Schram | 210/748 |
| 4,688,199 | 8/1987 | Lak | 367/137 |
| 4,743,361 | 5/1988 | Schram | 209/7 |
| 4,941,135 | 7/1990 | Schram | 367/150 |

FOREIGN PATENT DOCUMENTS

| | | |
|---|---|---|
| 0147032 | 7/1985 | European Pat. Off. . |
| 89/03243 | 4/1989 | PCT Int'l Appl. . |
| 87/07421 | 12/1987 | United Kingdom . |
| 87/07178 | 12/1987 | World Int. Prop. O. . |

Primary Examiner—Brian S. Steinberger
Attorney, Agent, or Firm—Cushman, Darby & Cushman

[57] ABSTRACT

A method of establishing an ultrasonic standing wave in a fluid medium is described in which the standing wave is produced by an acoustic energy output along a path extending through the fluid medium, the frequency of said energy output being changed cyclically while maintaining an essentially constant mean frequency. The cyclic frequency change sweeps said energy output frequency between upper and lower limits that represent a difference of at least one half-wavelength at the mean acoustic frequency over the length of said path, so that a fully resonant standing wave appears in each cycle, regardless of transient ambient variations. For stability, the cycle time of the sweep is maintained substantially greater than the travel time of the acoustic energy output over the length of the path.

10 Claims, 2 Drawing Sheets

ULTRASONIC SYSTEMS

BACKGROUND OF THE INVENTION

This invention relates to standing wave systems and in particular to the manipulation of particles suspended in a fluid medium in an ultrasonic standing wave system.

It has been proposed to employ ultrasonic standing waves for the control of the position and movement of particles in a fluid medium, as is described for example in EPs 147032 and 167406. The effectiveness of such systems is of course dependent on the degree of resonance between intersecting progressive waves which create the standing wave. To obtain full resonance from a pair of opposed sources, it is necessary for the distance between the sources to be set precisely, the determinant being the acoustic path length between the sources in terms of the wavelength of their radiation.

The fully resonant state is achieved when the path length between two opposed sources, or between a source and reflector, is equal to an integral number of half-wavelengths. As the acoustic distance changes, in either sense, the resonant effect is weakened and is finally completely lost when it becomes equal to an odd integral number of quarter-wavelengths. The rate of weakening from full resonance as the deviation from fully resonant conditions increases is the greater if the damping coefficient of the system is low. Nevertheless, while damping in a water-filled acoustic cavity operating at high frequency may be fairly large, quite minor deviations from the path length required for the fully resonant condition will still produce a sharp fall in the resonant effect.

If the path of the progressive waves of the system is long, e.g. if it occupies hundreds of half-wavelengths, which can be required particularly in high frequency, e.g. MHz, systems, the percentage change of acoustic distance (i.e. the distance measured in wavelengths) to move from fully resonant to completely non-resonant conditions can be extremely small. Moreover, as the acoustic path length increases the relative change of length that will transform conditions from the fully resonant to the completely non-resonant becomes smaller. It is therefore increasingly probable that variations of physical conditions or inhomogeneities, e.g. temperature fluctuations, will create acoustic path length changes of the same or a larger order completely randomly.

Some idea of the effects on small variations of conditions can be gathered from the example of a standing wave at a frequency of 2 MHz and having a path length of 200 mm in water at 21° C. and atmospheric pressure. At these conditions the sonic velocity in water is 1486.6 m/s, which gives an acoustic path length of 538.1 quarter-wavelengths, corresponding to an almost fully resonant condition. If the water temperature falls to 20° C., the sonic velocity becomes 1484 m/s to give a path length of 539.1 quarter-wavelengths, resulting in an almost complete loss of resonance.

The performance of resonant systems can therefore be adversely and uncontrollably affected by such changes. Correction of the fault by a closed-loop control of the means generating the acoustic energy is not a practical proposition because of the transient and random nature of many of the influences at work. For these systems to operate reliably and consistently in conditions in which external influences may not be easily controlled, there is a need for a method of limiting adverse effects from the causes described.

SUMMARY OF THE INVENTION

According to one aspect of the present invention, there is provided a method of establishing an ultrasonic standing wave in a fluid medium by generating an acoustic energy output along a path extending through the fluid medium, and in which the frequency of said energy output is changed cyclically to sweep said frequency between upper and lower limits that represent a difference of at least one half-wavelength at the mean acoustic frequency over the length of the path, the cycle time of the sweep being maintained substantially greater than the travel time of the acoustic energy output over the path length.

According to another aspect of the invention, there is provided means for establishing an ultrasonic standing wave in a fluid medium comprising transducer means arranged to propagate acoustic energy along a path extending through said medium, drive means for said transducer means including an arrangement for varying the output frequency of the acoustic energy from the transducer means, said arrangement comprising means for sweeping the frequency through a range that represents a difference of at least one half-wavelength at the mean acoustic frequency over the length of the path through the fluid medium.

In this manner, regardless of minor variations of such parameters as temperature, frequency or dimensions, imposing the frequency sweep will ensure that the standing wave experiences, for equal time intervals during the course of each frequency sweep cycle, every degree of resonance from zero to a fully resonant state. A stable time-averaged condition can thereby be achieved with an assured degree of resonance, despite the random variations that cannot be controlled. The sweep is preferably linear and can be continuous or stepped.

A sweep amplitude of one half-wavelength represents the minimum that will give with assurance a complete sequence of states from the fully resonant to the non-resonant. During each frequency sweep, conditions will move through both fully resonant and non-resonant states, so that a mean is achieved representing some intermediate condition over the imposed cycle time, irrespective of random variations. The system will thus not drift out of resonance but will be continually cycled through the resonant state. It is possible to increase the range of sweep but there is unlikely to be any advantage in so doing. Indeed, the ultrasonic energy will be generated by transducers selected for resonance at the nominal frequency and increasing the sweep range can move conditions too far away from the transducer resonant frequency, which would reduce performance.

The cycle time of the frequency sweep can be selected as required between very wide limits. The minimum cycle time should be at least several times greater than the time of flight of the ultrasonic energy between opposite ends of the acoustic path, preferably at least some ten times greater, in order to avoid undue instability in the conditions of resonance over the path length. The maximum cycle time should be very much smaller than the anticipated periodicity of the random influences that the method seeks to minimise. As a matter of convenience, cycle times considerably less than one second might be employed, which is more than adequate for temperature fluctuations, for example, occurring over a period of some minutes at the very least.

The invention will be further described by way of example with reference to the accompanying schematic drawings.

DESCRIPTION OF THE PREFERRED EMBODIMENTS

Figure 1:
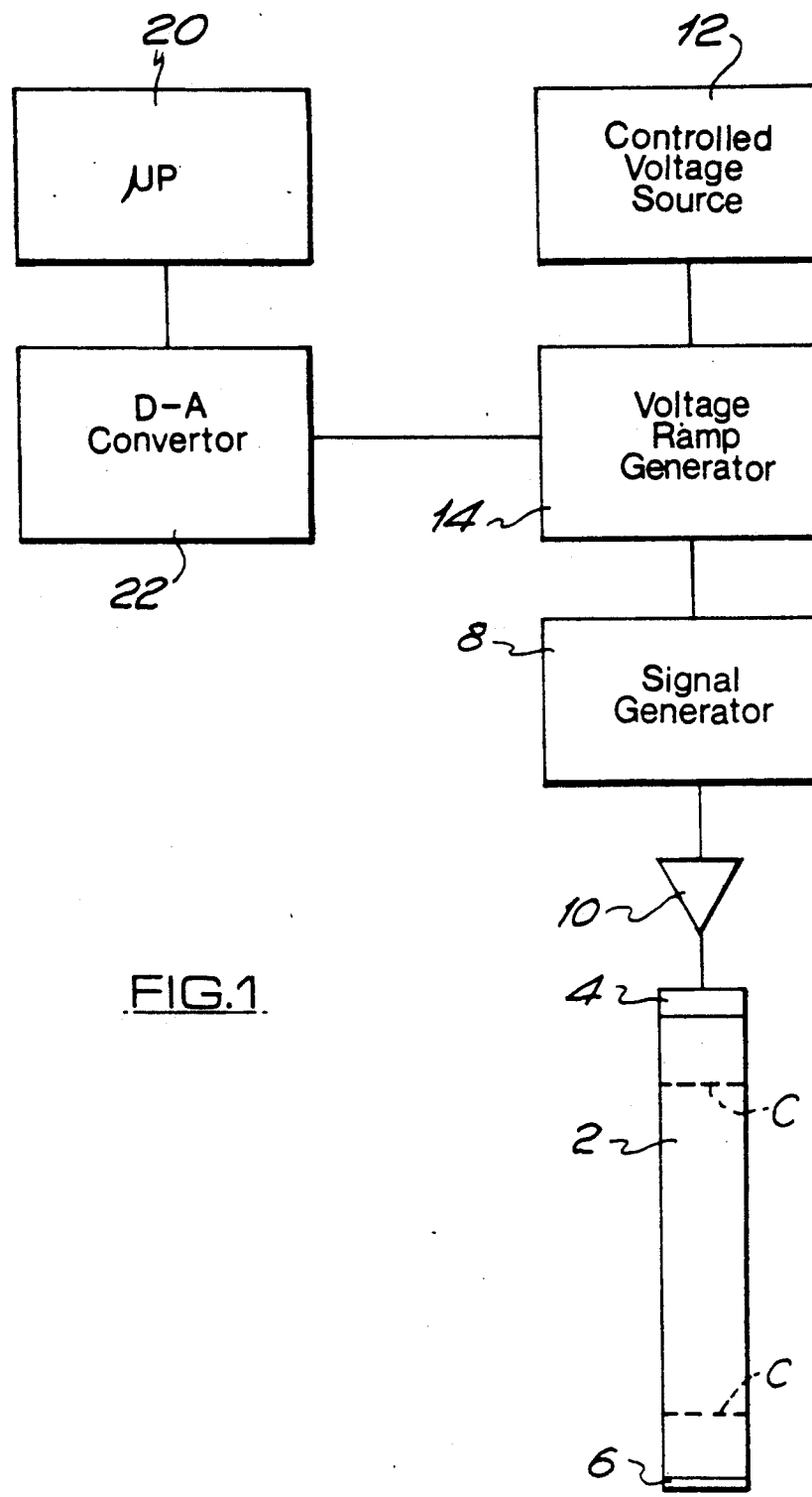
FIG. 1 is a schematic diagram of apparatus for performing the method according to the present invention.

In FIG. 1, a liquid-filled column 2 intended, for example, for the manipulation of particles suspended in the liquid, has an ultrasonic transducer 4 mounted on one end and a reflector 6 on the other. The longitudinal axis of the column, the axis for propagation of acoustic energy from the transducer and the axis of the reflector are all coincident. The transducer 4 is actuated by a signal generator 8 via an amplifier 10. The signal generator 8 is of the type that is voltage-dependent for its output frequency and a controlled voltage source 12 operating the generator is connected to it via a voltage ramp generator 14, whereby the output frequency of the signal generator 8 is correspondingly ramped over the required range, preferably in a series of steps, so as to give a variation in the acoustic path over the length of the column of at least one half-wavelength. The effect is to produce a time-averaged mean standing wave that is uniform when considered over periods of a greater order than the sweep period.

A fixed voltage ramp can be provided by hard wiring in the ramp generator 14. There can alternatively be a variable control means which allows the wavelength change to be varied, whether to suit different acoustic path lengths or different mean frequency levels. Analogue control means can be used to determine the voltage ramp but it may be preferred to employ the digital method that is also illustrated in the figure. The optional digital control comprises a microprocessor 20 acting as a control unit and programmed to generate the ramp in digital form. The microprocessor output is converted in a digital-analogue converter 22 to provide a controlling input to ramp generator 14 determining the form of the voltage ramp.

Figure 2:
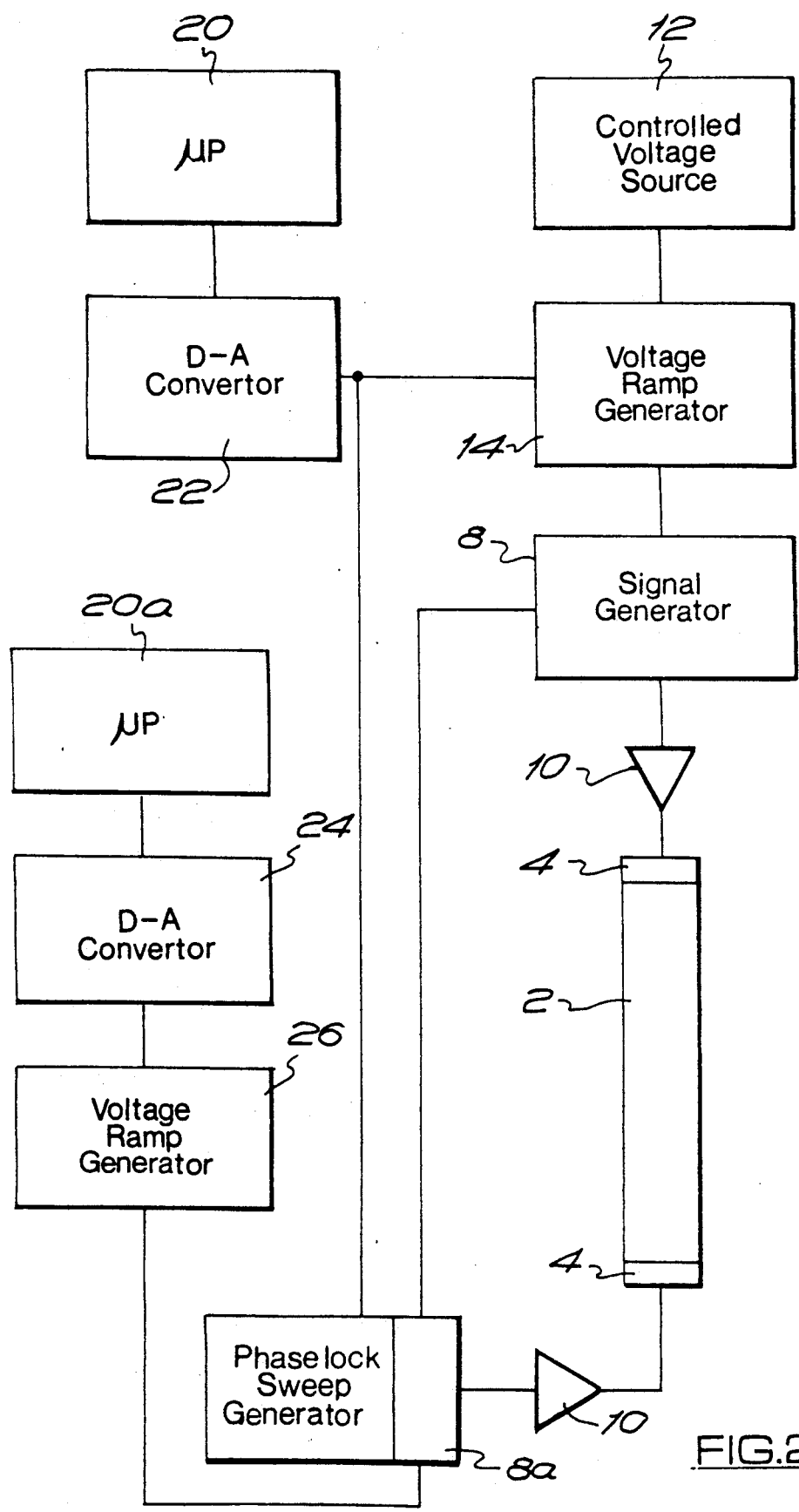
FIG. 2 is a modified version of the apparatus in FIG. 1.

It is also possible, if required, to generate the standing wave by the use of opposed, coaxial transducers at opposite ends of the column. FIG. 2 is an example of such an arrangement and uses the same references as FIG. 1 for the same elements. The two transducers 4 are mounted coaxially at opposite ends of the liquid-filled column 2 and are driven through respective amplifiers 10 to produce a standing wave through the interaction of their outputs in the column. By operating with a small frequency difference between the two outputs it is possible to produce an axial movement of the standing wave, but in the illustrated example the effect of a moving standing wave is obtained by a sequential change of phase between the two outputs, essentially in the manner disclosed in EP 173435.

In FIG. 2, the signal source for one of the amplifiers is the generator 8 of FIG. 1 while for the other there is a generator 8a in the form of a modified Wavetek Model 186 5 MHz Phase Lock Signal Generator (produced by Wavetek Inc, San Diego, Calif.). As described in EP 173435, biasing voltage signals are produced by the Wavetek generator 8a, under the control of a microprocessor 20a (or the same microprocessor 20) to produce a series of phase shifts which are experienced in the acoustic field as a progressive movement of the standing wave. The microprocessor output actuates the input to the generator 8a via digital-analogue converter 24 and voltage ramp generator 26.

The basic operating frequency of both generators 8,8a is modified by the other voltage ramp, i.e. the ramp produced by the ramp generator 14, so producing the cyclic frequency change described with reference to FIG. 1 for both transducers 4 simultaneously. The basic operating frequency is itself established by the controlled voltage source 12 and is modified by the frequency ramp signals from the D-A convertor 22 to the voltage ramp generator. This ramped frequency signal thus determines the frequency of both signal generators 8,8a. The phase lock section of the generator 8a is supplied with a phase-locking input from the generator 8a but it also receives the phase shift voltage ramp determined by the microprocessor 20a. The has a phase that is shifted in relation to the phase of the generator, in accordance with the phase shift ramp. In general, there is no need to maintain a precise relationship between the cycle times of the frequency sweep and the phase shift, but the phase shift cycle time will be one or more orders of magnitude less than the frequency sweep cycle time.

As in the case of the microprocessor 20, it is also possible to substitute hard wiring for the phase shift function of the microprocessor 20a, particularly if it is not intended to change the pattern of movement of the standing wave.

As regards the range of the frequency sweep, there is a limit to the extent to which the operating frequency of an ultrasonic transducer can be varied. In many cases, the ratio of the sweep range to the nominal frequency will normally be required to be kept below 2:1000. By employing transducers with relatively low Q values, however, this ratio can be increased if required.

As an example of the application of the invention, there may be considered the requirement to obtain a half-wavelength change for a 2 MHz ultrasonic signal over a path length of 400 mm in water. At 20° C. the 400 mm corresponds to an acoustic distance of 1078.17 half-wavelengths. To change this by one half-wavelength corresponds to a frequency change of 1.85 kHz. The range of the sweep required is in fact relatively insensitive to temperature change, even though there is a significant change in the acoustic distance, as the following table shows:

| Frequency (MHz) | Half-wavelength in 400 mm water | |
|---|---|---|
| | 20° C. | 30° C. |
| 2.0000 | 1078.17 | 1059.60 |
| 2.00185 | 1079.16 | 1060.59 |

In order that the maximum resonance conditions should be operative in a quasi-static manner, the sweep cycle time should be long relative to the acoustic travel time over the path length. In the present example, the travel time over 400 mm is 0.27 milliseconds and a sweep cycle time of 10 milliseconds might be chosen.

As the path length decreases, the frequency sweep range for any given nominal frequency must increase to obtain the same half-wavelength change of the acoustic distance. Where the path length is short enough, the random influences that cannot be controlled may no longer have any substantial effect on the resonant state of the ultrasonic energy input. There may nevertheless be an intermediate range of path lengths in which this cannot be relied on and yet the change of frequency to produce the half-wavelength variation may be beyond the effective operating range of the transducers. In such a case, the overall length of the path travelled by the acoustic energy can be increased by employing coupling blocks. Preferably the blocks are of a material offering low attenuation of the acoustic energy, in particular an aluminium alloy such as dural.

As an example, if an acoustic path length of 100 in water is coupled to ultrasonic transducers outputting at 2 MHz through 100 mm thick blocks of dural at opposite ends of the water path, extending over the cross-sectional area of the water path, the complete acoustic path between those transducers has a length of 394.5 half-wavelengths, although the acoustic distance over the water path itself is 269.54 half-wavelengths. There is no significant attenuation by the coupling blocks of the flow of acoustic energy in the coupling blocks before it reaches the water path. Over the increased path length, an acoustic distance change of one half-wavelength corresponds to a frequency change of 5.07 kHz, i.e. a frequency sweep range of approximately 2.5:1000, which can be achieved using known transducers with relatively low Q values. The frequency sweep range that would be required for the 100 mm water path alone, would be more than 3.7:1000.

It should be appreciated that other solid materials can be employed for the coupling blocks at opposite ends of the liquid path, including other metals and glass.

The present invention can be employed in conjunction with other techniques for rendering more effective the separation of liquid-borne particles by ultrasonic standing waves. For example compensation for attenuation of the acoustic energy can be achieved by the method disclosed in PCT/W087/07421. Acceleration of the rate of separation of different types of particles can be obtained by use of the method disclosed in EP 167406, in which the ultrasonic energy propagation is varied cyclically to affect the different particle types differently, bearing in mind that in relation to the periodicity of the energy variation the frequency sweep periodicity should be kept very small, for similar reasons to the limitation of the maximum frequency sweep cycle times referred to earlier herein.

I claim:

1. A method of establishing an ultrasonic standing wave in a fluid medium comprising the steps of:
   (i) generating an acoustic energy output along a path extending through the fluid medium,
   (ii) changing the frequency of said energy output cyclically while maintaining an essentially constant mean frequency,
   (iii) controlling said cyclic change to sweep said energy output frequency between upper and lower limits that represent a difference of at least one half-wavelength at the mean acoustic frequency over the length of said path,
   (iv) maintaining the cycle time of the sweep substantially greater than the travel time of the acoustic energy output over the length of the path.

2. A method according to claim 1 wherein the cycle time of the frequency sweep is of a greater order than the time of flight of the acoustic energy over said path in 3. A method according to claim 1 wherein the cycle time of the frequency sweep is less than 1 second.

4. A method according to claim 1 wherein the frequency sweep is substantially linear.

5. A method according to claim 1 wherein the standing wave is produced by interaction between the outputs from respective ultrasonic transducers, said method further comprising the step of progressing the nodes of the standing wave along said path by a series of relative phase changes between said outputs, and said phase changes are given a cycle time that is at least an order of magnitude less than the cycle time of the frequency sweep.

6. A method according to claim 1 wherein said acoustic energy output, at least at one end of said fluid path, is directed through a solid medium giving a relatively low attenuation of the acoustic energy, whereby to increase the overall path length of said acoustic energy output.

7. Means for establishing an ultrasonic standing wave in a fluid medium, comprising transducer means arranged to propagate acoustic energy along a path extending through said medium, drive means for said transducer means, control means in said drive means for maintaining an essentially constant mean output frequency for the acoustic energy from the transducer means while varying said frequency cyclically, said control means comprising means for sweeping the frequency through a range that represents a difference of at least one half-wavelength at said mean output frequency over the length of the path through the fluid medium.

8. Means according to claim 7 wherein said frequency sweep means comprises means for inputting a series of digital signals and for generating a ramp from said signals for controlling said transducer means.

9. Means according to claim 7 wherein respective transducers are provided for generating the standing wave by the interaction of their outputs and the control means further comprises means for relative phase changes between said outputs for progressing the nodes of the standing wave along said fluid path, said frequency sweep means providing controlling signals for said transducers.

10. Means according to claim 7 wherein, at least at one end of said path through the fluid medium, a solid medium giving a relatively low attenuation of the acoustic energy is located to provide a continuation of said path, whereby to form an overall path length substantially greater than the path length through said fluid medium.

* * * * *